US010392150B2

(12) United States Patent
Forsthovel et al.

(10) Patent No.: US 10,392,150 B2
(45) Date of Patent: Aug. 27, 2019

(54) PLASTIC CONTAINER

(71) Applicant: Niagara Bottling, LLC, Ontario, CA (US)

(72) Inventors: Jochen Forsthovel, Regensburg (DE); Alexander Schau, Regensburg (DE); Gerald Huttner, Vilseck (DE); Andrew Dimitri Peykoff, Newport Coast, CA (US); Jay Clarke Hanan, Glendora, CA (US)

(73) Assignee: Niagara Bottling, LLC, Ontario, CA (US)

( * ) Notice: Subject to any disclaimer, the term of this patent is extended or adjusted under 35 U.S.C. 154(b) by 205 days.

(21) Appl. No.: 14/271,947

(22) Filed: May 7, 2014

(65) Prior Publication Data

US 2014/0238951 A1 Aug. 28, 2014

Related U.S. Application Data

(63) Continuation of application No. 13/771,241, filed on Feb. 20, 2013, now abandoned.

(30) Foreign Application Priority Data

Feb. 20, 2012 (DE) ........................ 10 2012 003 219

(51) Int. Cl.
*B65D 1/02* (2006.01)
*B65D 1/42* (2006.01)
*B29C 49/48* (2006.01)

(52) U.S. Cl.
CPC ........... *B65D 1/0223* (2013.01); *B29C 49/48* (2013.01); *B65D 1/0261* (2013.01);
(Continued)

(58) Field of Classification Search
USPC ................ 215/42, 370, 373, 374, 375, 382; 220/671, 672, 675; 425/542
See application file for complete search history.

(56) References Cited

U.S. PATENT DOCUMENTS 5,785,197 A 7/1998 Slat
6,112,925 A 9/2000 Nahill et al.
(Continued)

FOREIGN PATENT DOCUMENTS

DE 69813841 12/2003
DE 602004008115 4/2008
(Continued)

OTHER PUBLICATIONS

United States Patent Office Action for U.S. Appl. No. 13/771,241 dated Feb. 7, 2014 (17 pages).

*Primary Examiner* — James N Smalley
*Assistant Examiner* — Madison L Poos
(74) *Attorney, Agent, or Firm* — Hani Z. Sayed; Rutan & Tucker LLP

(57) ABSTRACT

Plastic container (1) being composed of a neck (3), a shoulder (5), a body (4) and a base section (2), where the base section (2) comprises at least two tie members (6*a*) extending from a central area (8) to the side wall of the base (2). According to the invention, the tie members (6*b*, 6*c*) and/or the function of the tie members (6*b*, 6*c*) of the base (2) at least in certain areas extend into the body section (4) or into the body (4) and the shoulder section (5) of the plastic container (1).

11 Claims, 11 Drawing Sheets

(52) U.S. Cl.
CPC ............. *B65D 1/0284* (2013.01); *B65D 1/42* (2013.01); *B65D 2501/0036* (2013.01)

(56) References Cited

U.S. PATENT DOCUMENTS

| | | | |
|---|---|---|---|
| 7,445,826 B2 | 11/2008 | Collette et al. | |
| 7,802,691 B2 | 9/2010 | Musalek | |
| 2007/0145000 A1 | 6/2007 | Musalek | |
| 2008/0173614 A1 | 7/2008 | Matsuoka | |
| 2008/0223816 A1 | 9/2008 | Darr et al. | |
| 2008/0257855 A1* | 10/2008 | Patel | 215/370 |
| 2014/0183202 A1* | 7/2014 | Hanan | B65D 1/0284 220/669 |

FOREIGN PATENT DOCUMENTS

| | | |
|---|---|---|
| DE | 202008012290 | 11/2008 |
| WO | 2006067590 | 6/2006 |

* cited by examiner

PLASTIC CONTAINER

BACKGROUND OF THE INVENTION

The present invention relates to a plastic container which can be used in particular for beverages. In the field of the beverage-producing industry, more and more plastic containers, especially for PET containers, have in recent times prevailed over glass bottles. In this, the most different basic shapes or cross-sections, respectively, of such plastic bottles are known.

The terms (plastic) container, bottle or container shall in the following be used as synonyms.

Such a plastic container generally comprises the following areas: a base, a body, a shoulder and a neck, which merges into a mouth opening.

The PET bottles initially used were usually relatively heavy and thereby also quite stable.

However, efforts have in recent years been made in the production of such containers to further reduce material consumption, thereby cutting costs. This results in the walls and the base of these containers being designed thinner and thinner.

On the other hand, it is important to make sure that the bottle wall, and especially the base of these containers is designed strong enough to withstand, firstly, a filled bottle's own weight, and secondly, also a possibly developing internal pressure, especially with carbonated beverages. Strongly ribbed designs are usually used in prior art for filling non-carbonated beverages.

Such ribs have the advantage that they provide good gripping stability, and the necessary top load can be warranted arising, for example, due to an axial load when palletizing.

However, relatively smooth-walled designs are always used for bottling carbonated beverages, as strong ribbing, when subjected to internal pressure, leads to a strong expansion in height, in that the ribs are by the pressure drawn in length in an accordion-like manner. This axial elongation leads to a destruction of the design.

Such smooth-walled containers, however, are accompanied with increased material consumption and moderate gripping stability.

In order to design the base of a container in a manner resistant to pressure at a low weight, it is known to provide tie members extending from the injection point up to the outer side of bottles. These are used to keep the injection point up, so that the bottle stands on its feet and does not start tilting.

WO 2006/067590 A1 describes such a bottle base made of plastic. More precisely, reinforcement recesses are there provided extending transversely in relation to the bottle base, where an end-to-end main rib is disposed in the base. Here, said main ribs extend up to an injection point of the container. By means of such a design of the bottle base, increased stability can be achieved, however, in particular in the area of the injection point, there might possibly be resulting unfavorable stress distribution due to the design of the respective reinforcement ribs.

DE 202008012290 U1 as well describes a base with such tie members.

Though the base section is significantly more stable due to the presence of the tie members, this measure has no effect on the stability of the bottle in the central body or shoulder section.

SUMMARY OF THE INVENTION

The present invention is therefore based on the object to increase the stability of thin-walled plastic bottles above the base and in particular to also increase pressure resistance. In addition, also the material required for the production of these plastic containers is to be further reduced. Furthermore, increased gripping stability is to be achieved.

A plastic container according to the invention comprises a neck, a shoulder, a central body and a base section, where the base section comprises at least two tie member extending from a central area to the side wall of the base. The tie members and/or the function of the tie members of the base at least in certain areas extend into the body section (4) or into the body and the shoulder section (5) of the plastic container (1).

A tension area always extends from the base section into the body section. In advantageous embodiments, the tie member can even be continued into the shoulder section.

Tie member in the context of the invention is understood as being a reinforcing groove extending from the central region of a container base, thus from the injection point, which is located centrally on the longitudinal axis of the container, in a radial direction in order to increase the stability of the base. A very advantageous extension of the tie members is realized over known prior art, in that the tie members of the base do not end at the outer base edge, but extend beyond that into the outer cover surface running substantially axial, in particular approximately parallel to the container longitudinal direction.

In a preferred embodiment, there are all-around grooves provided at least in certain areas in the peripheral direction between the tie members and/or above and/or below the tie members in the shoulder and/or body section.

Grooves are hereinafter understood to be in particular recesses advantageously in certain areas extending straight or wavy, which extend preferably towards the direction of the interior of the container. By means of these grooves, profile enhancement is achieved without there being the need for considerably increasing the wall thickness. In this manner, the gripping stability of the bottle is increased considerably.

Alternatively, however, other structural elements, such as wedges, can also be provided to increase gripping stability.

The tie members and/or the tie member function are preferably designed extending substantially in the longitudinal direction on the circumference of the container from the base towards the neck or the mouth of the container (1) Longitudinal direction is understood to be the extension of the container from the base in the direction of the mouth. The longitudinal direction, when the container is standing upright, essentially runs perpendicular with respect to the horizontal direction, but can also deviate by up to an angle of 30° from the perpendicular direction.

The tie members are used in the region of the body to significantly increase pressure resistance of the container.

The section profile of the tie member region can, in particular in the area of the side wall of the base, have a constant radius of curvature.

In a further advantageous embodiment, the base comprises at least two, advantageously at least three feet, and the number of feet is a multiple of the number of tie members.

Preferably, for two tie members, there are 2, 4, 6, 8, 10 or 12 feet and for three tie members 3, 6, 9 or 12 feet.

Preferably, a number of two or three tie members, but also four, five, six or more tie members are conceivable according to the invention. In particular 2 to 9 tie members, especially 3 to 6 tie members can be provided. In particular, the number of tie members can be 3 or 6.

With only one tie member, the bottle would grow on one side under internal pressure and become lop-sided. With four or more tie members, the rib structure is interrupted too frequently, which significantly decreases gripping stability.

Particularly preferably, the tie members respectively extend in a region between two feet. This means, on each side of the tie member there is always at least one foot.

In the base section, there can in particular be one or more reinforcement grooves provided extending in particular in the radial direction. By means of these, the base section can be stabilized.

There can be at least one reinforcement groove provided between each two tie members, in particular 1 to 5 reinforcement grooves.

Reinforcement groove can herein be understood in particular as being a recess or indentation advantageously in certain areas extending straight or wavy, which extend preferably in the direction of the interior of the container.

At least one reinforcement groove can in the radial direction have a varying depth. The depth can therefore vary depending on the distance from the central axis of the container.

A foot rim interrupted by tie members and/or reinforcement grooves can additionally be formed in the base section. The container can in the intended use be placed on a planar surface in the region of the foot rim. In other words, when the container is placed upright, it can in the region of the foot rim rest on a planar surface.

The foot rim can in the radial direction in particular have a width of between 0 mm and 5 mm. If the width of the foot rim is less than 0.5 mm, no planar resting surface is available any longer and this can also be referred to a as a punctiform or line rest or an annular rest.

At least one reinforcement groove can in the area of the foot rim have the maximum depth. In this case, this can be in particular an above-mentioned reinforcement groove of varying depth.

In the area of the injection point, the wall of the plastic container can with respect to the surrounding base section be curved inwardly, thus forming a central dome. In this manner, the stability of the base section can be further increased. The central dome can in particular be immediately adjacent to the injection point.

The base section can also be designed without a central dome.

When a central dome is formed, then the tie members can extend into the area of the central dome.

Alternatively, the tie members can tangentially peter out prior to the area of the central dome, in particular to 0 mm depth, i.e. to the level of the surrounding base area.

The central dome can have a constant radius of curvature. The radial extension of the central dome can be less than the radius of the annular rest. In other words, the central dome can be spaced from the annular rest.

The central dome can in particular be adjacent to a further region of the base, in which the wall of the plastic container is curved inwardly, where the curvature of this region differs from the curvature of the central dome. The further region can in particular have a larger radius of curvature than the central dome.

The central dome can in particular be adjacent to still an additional region of the base, in which the wall of the plastic container is curved inwardly, where the curvature of this region differs from the curvature of the further region. Here, a step can be formed between the different regions. The region of curvature of the additional region can in particular be greater than that of the further region. The additional region can then merge into the foot rim.

Alternatively, the further region can also be connected via a planar surface with the foot rim. In a longitudinal section, the curved further region can therefore be connected via a straight line with the foot rim.

Alternatively the wall can in the region between the injection point and the foot rim have a constant curvature directed inwardly. In this case, the base section is therefore within the foot rim curved towards the interior of the container.

As described above, indentations in the form of reinforcement grooves as well as tie members can be provided in the curved or planar regions described.

In another advantageous embodiment, the tie members extend across certain regions of the bottle, in particular across the body section up into the shoulder section, or only across the body region, or only across partial regions of the body or the shoulder. These different embodiments allow creative freedom and enable different designs, depending on the level of pressure resistance that the bottle needs to have.

Preferably, the tie members end immediately before or after a labeling area of the body and/or the shoulder, intended for receiving at least one label.

Depending on the label, different requirements are associated with the area in which the label is to be applied. For example, it can be a hindrance to apply adhesive if a tie member protrudes at the intended location.

Furthermore, it can be advantageous, however, to wet in particular the surface created by the tie member with adhesive to affix the label there. If the area intended for receiving a label is located in the outer cover surface in the longitudinal extension of the container in the plane of a tie member, then it functionally forms a continuation of the tie member, even if no circumferential ribbing exists. The wall thickness can then be limited to the thickness of the tie member.

In a further advantageous embodiment, the tie members extend radially inwardly transversely, in particular perpendicularly, to the circumferential grooves.

Transversely in the context of the invention is understood to mean that, if the circumferential grooves, when the container is standing upright, extend at least in certain areas horizontally, then the tie members extend in a direction disposed approximately perpendicular thereto, i.e. in particular in the longitudinal direction of the container.

Radially inward is understood to mean that the bottom of the grooves is located closer to the bottle axis.

In a further preferred embodiment, the tie members form at least one stringer which projects radially outwardly and at least in certain areas extends through the circumferential grooves. Stringer is now understood to be the reverse case, namely that a groove extends radially projected outwardly from the inner side of the container. This stringer can in its function also be continued in the direction of the neck section, so that circumferential transverse grooves are at the same time disposed therebetween.

Preferably, these circumferential grooves have varying depths in the peripheral direction. Particularly preferably, the circumferential grooves, at the locations at which they have the function of a tie member, have a distinctly shallower depth as in the intermediate areas. This is particularly advantageous because grooves with a shallow depth are very pressure resistant. At greater depths, the pressure resistance decreases and the bottle lengthens under pressure influence.

In a further preferred embodiment, the tie members are formed in the labeling area such as to enable application of a label. Advantageously, the tie member is in the labeling area designed more broadly in order to enable, for example, application of adhesive. Though the tie member thereby further extends in the axial direction of the container, the geometry, however, can be changed in the area.

According to an alternative, the tie members can also lead axially to the lowermost groove running circumferentially in the peripheral direction. As a result, the groove bottom and the tie member bottom are in one plane.

The invention also provides a plastic container, comprising a neck, a shoulder, a body and a base section, where said base section comprises at least two tie members extending from a central area to the side wall of the base, and where the base section is provided with one or more reinforcement groove extending in particular in the radial direction.

The plastic container, in particular the base section can comprise one or more of the above mentioned features.

Preferably, a blow mold is preferably provided for producing a plastic container from a plastic preform with which a plastic container according to the invention can be produced.

In a further advantageous embodiment, an apparatus for producing a plastic container from a plastic preform by blow molding is provided, which comprises blow-molding for producing a plastic container according to the invention.

Blow molding, in particular stretch blow molding or extrusion blow molding, is understood to be a method for introduction of compressed air into a preform, thereby, in particular with the aid of a stretching rod, forming a plastic container. The blow mold, which is a negative of the plastic container, is suitable to give the plastic container its desired shape. Blow molding can be performed either on rotating carousels or stationary linear machines.

BRIEF DESCRIPTION OF THE DRAWINGS

Further advantages and embodiments will become apparent from the accompanying drawings.

DETAILED DESCRIPTION

Figure 1B:
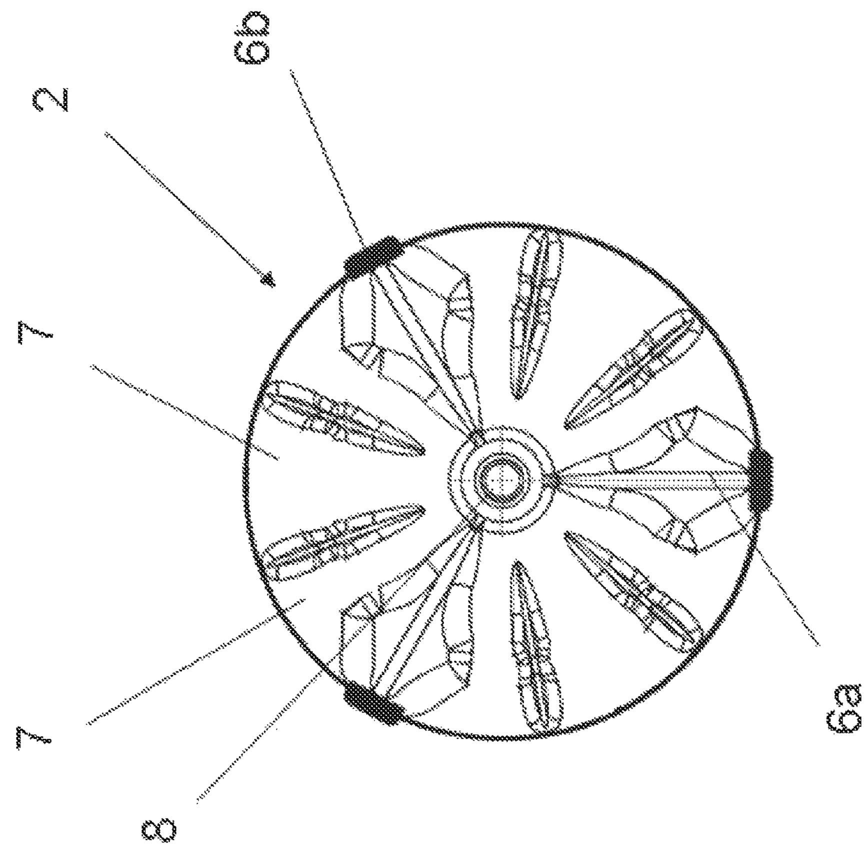
FIG. 1B shows an alternative view of a container according to the invention from below towards the base.
Figure 1A:
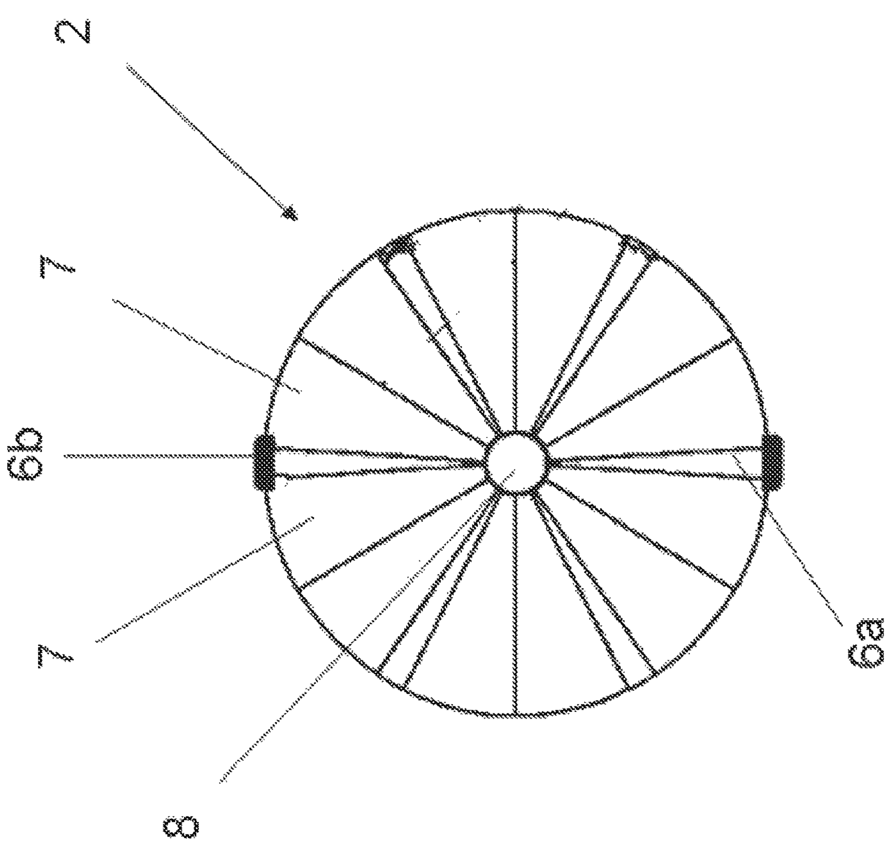
FIG. 1A shows a view of a container according to the invention from below towards the base.

FIGS. 1A and 1B show two embodiments of the base 2 of the container 1 according to the invention. Here, the base 2 comprises an injection point 8 in a central area. The tie members 6*a* originating from there reach up to the outer wall region of the base and serve to draw the injection point towards the container cavity so that any tilting of the container is prevented.

These tie members 6*a* being arranged in the base section 2 increase the resistance of the base to pressure, so that carbonated beverages can be bottled without any problems and without deforming the base towards the outside.

FIG. 1A shows an advantageous embodiment of a base according to the invention in which exactly two tie members 6*a* are extended into the body section 4 of the container 1 (shown schematically by the points marked in thick black). Each tie member 6*a* is arranged exactly in the space between two feet 7. In FIG. 1A, a total of 12 feet are drawn in. The number of feet is advantageously a multiple of the tie members. For two tie members, 2, 4, 6, 8, 10, 12, etc. feet are therefore to be provided according to the invention.

An alternative advantageous embodiment of the invention is shown in FIG. 1B. Here, three tie members are provided in the base section, which can be extended into the body and/or the should section 5. For three tie members, it is advantageous to provide 3, 6, 9, 12, etc. feet. In the embodiment shown in FIG. 1B, 9 feet are provided.

Figure 2C:
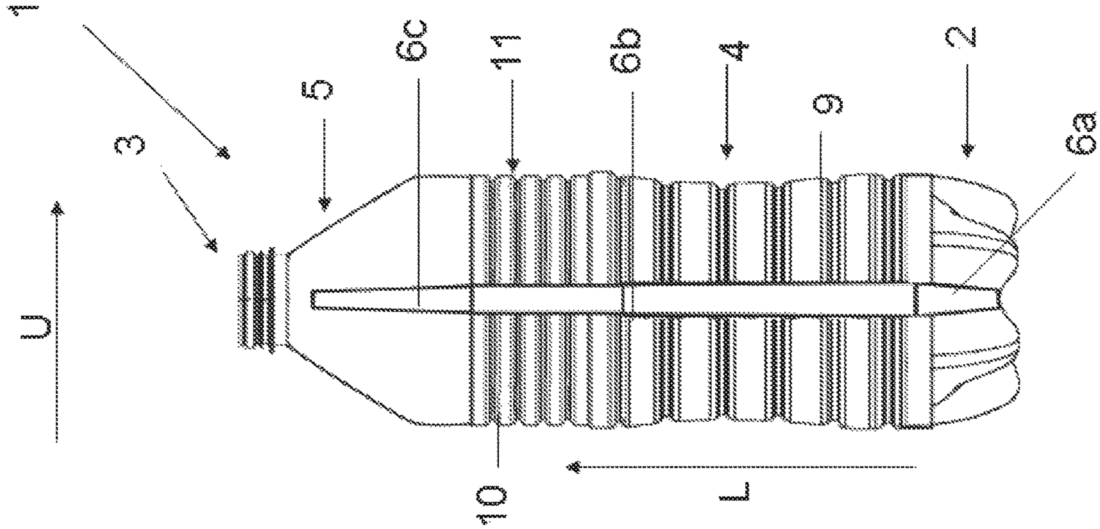
FIG. 2C shows an alternative side view of a container according to the invention.
Figure 2B:
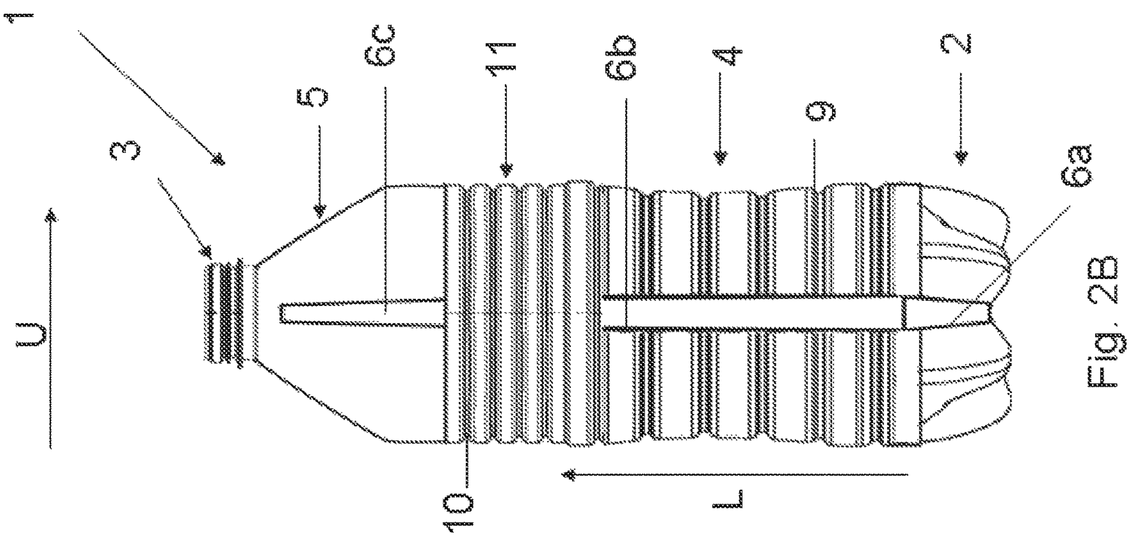
FIG. 2B shows an alternative side view of a container according to the invention.
Figure 2A:
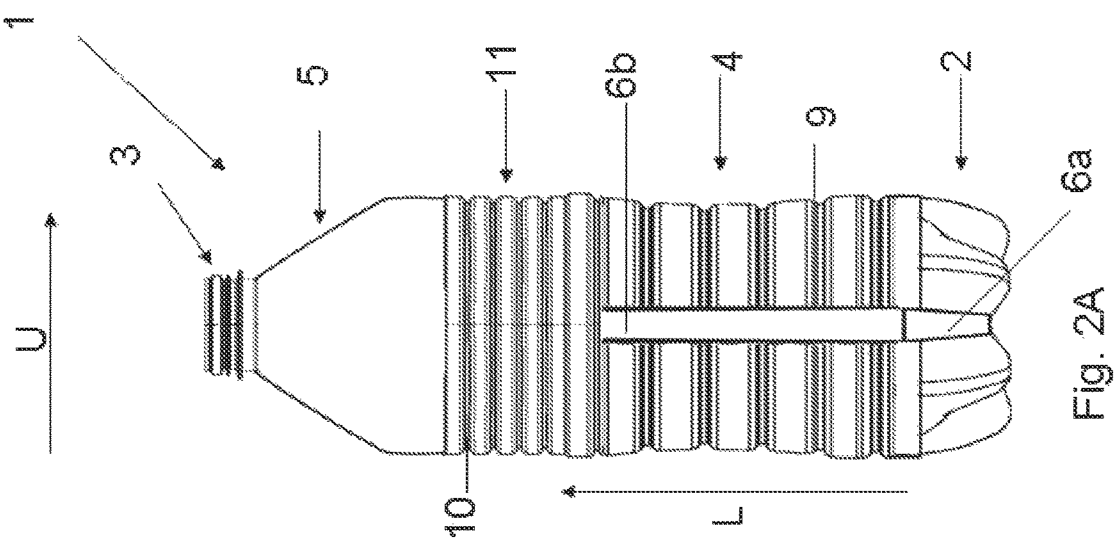
FIG. 2A shows a side view of a container according to the invention.

FIG. 2A, FIG. 2B and FIG. 2C show side views of an advantageous embodiment of the invention. There, a container 1 is shown comprising a neck section 3, a body section 4, a shoulder section 5 and a base section 2.

There, in the region of the central body, grooves 9, 10 are applied, enabling increased gripping stability of the container 1. The reference numeral 6*b* shows this extended tie member. The extension of the tie member 6*b* in the body section also there allows for embodying the container in a more pressure resistant manner. Thereby, the functions of gripping stability and pressure resistance are united in one container 1 by the two different elements of the grooves 9, 10 and the tie members 6*b*.

The tie member 6*b* drawn in can here, on the one hand, at least partially be formed as a groove extending in the longitudinal direction L, i.e. substantially perpendicular to the peripheral direction U of the container 1 or in the shape of a radially outwardly projecting bar or rib, respectively. In this, it is irrelevant whether the tie members 6*b* are extended visibly or only in their function in the direction of the neck section.

For extending the function, as shown in FIG. 2B, it is possible to provide the grooves 10 located in the labeling area 11 of the container with varying depth in the peripheral direction U. More preferably, the grooves 10 have a shallower depth in the extension of the tie member 6*b* than in the regions between the tie members 6*b*, in order to there create increased stability.

FIG. 2B shows an alternative embodiment very similar to that of FIG. 2A, with the difference being that the tie member 6*b* in FIG. 2B projects up into the shoulder section 5 (see tie member 6*c*).

FIG. 2C shows a further alternative embodiment. There, the tie member 6*b* itself and not only the function of the tie member 6*b* is directed through the labeling area 11. The entire tie member 6 in FIG. 2C therefore extends from the injection point 8 across the tie member 6*a* in the base section 2, as well as the tie member 6*b* in the body section 4 up to the shoulder section 5, in which the tie member 6*c* is shown.

All three embodiments are containers with two tie members 6*a*, 6*b*, (6*c*) and six feet 7.

Figure 3C:
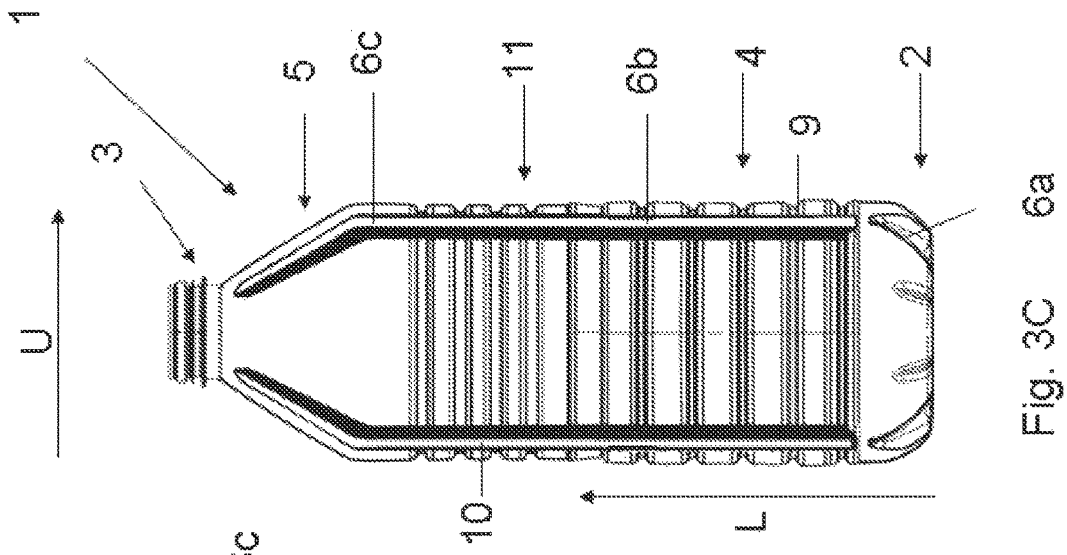
FIG. 3C shows an alternative side view of a further embodiment of a container according to the invention.
Figure 3B:
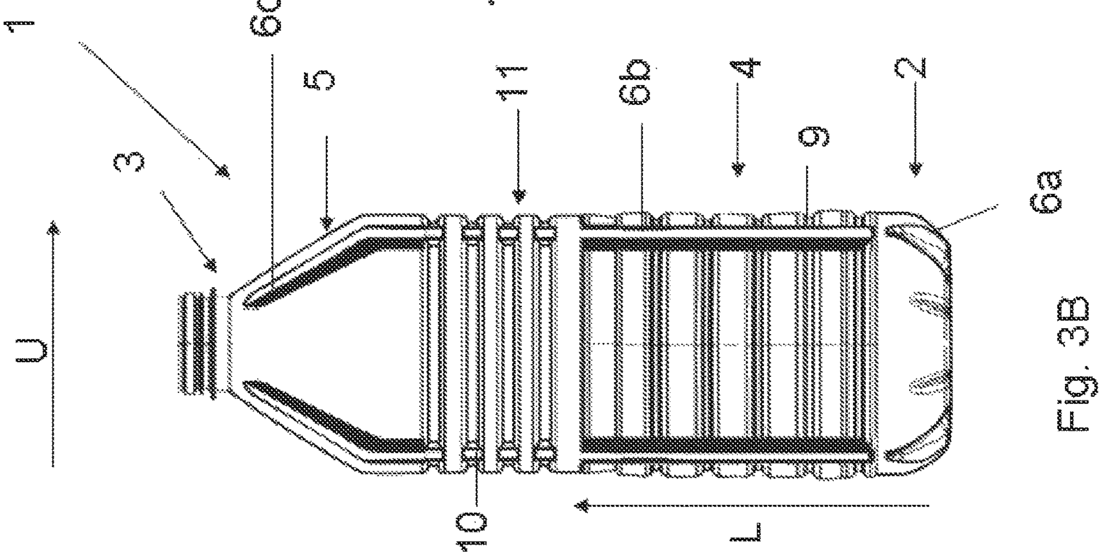
FIG. 3B shows an alternative side view of a further embodiment of a container according to the invention.
Figure 3A:
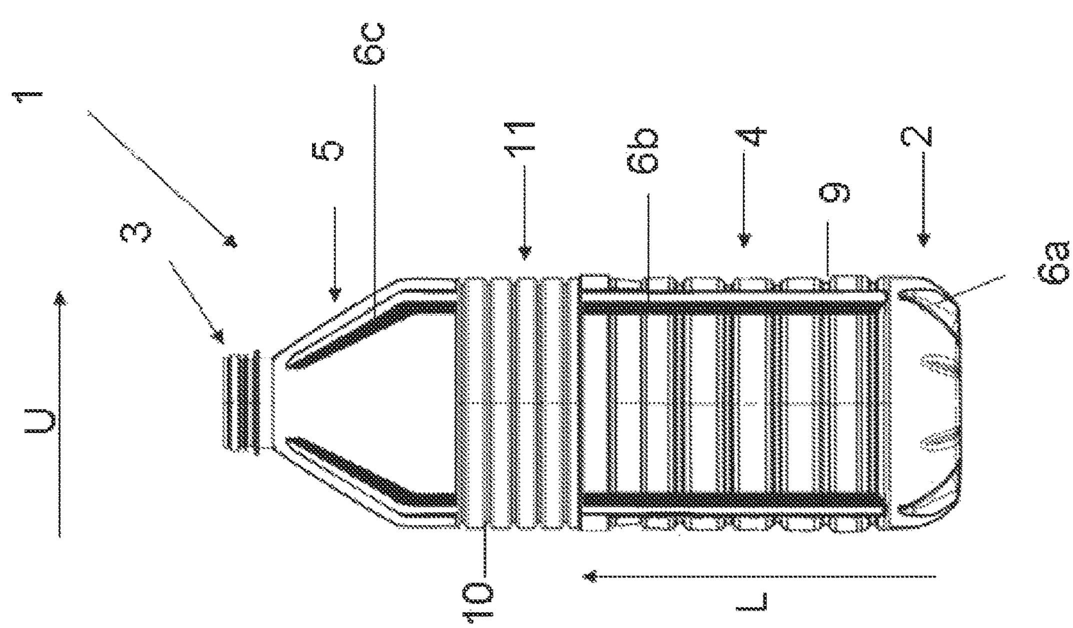
FIG. 3A shows a side view of a further embodiment of a container according to the invention.

FIG. 3A, FIG. 3B and FIG. 3C show side views of an alternative embodiment of the invention. In FIGS. 3A, 3B and 3C tie member 6*b* and 6*c* project radially outwardly. However, alternatively the tie members 6*b* and 6*c* may also be provided to extend radially inwardly.

In contrast to FIG. 2A, FIG. 2B and FIG. 3C here each show a container 1 with three tie members 6*b* and nine feet 7. The two embodiments shown with two and three tie members 6*b* therefore make sense because polygons (the triangle is formed when mentally connecting the tie members in the inside of the bottle with straight lines) are defined geometrically only up to a corner number of three. However, four, five, six or more tie members are conceivable, however, the stability is thereby then again reduced.

FIG. 3A shows a representation similar to FIG. 2B. FIG. 3C is again very similar to FIG. 2C.

FIG. 3B, however, shows an alternative embodiment in which the tie member 6*b* can only in certain areas be seen in the labeling area 11. Here again, however, the function of the tie member 6 is extended into the shoulder section 5, it is merely another embodiment of the tie member 6 in technically different design.

Furthermore, it is also conceivable to apply the design of FIG. 3B for a bottle 1 as shown in FIG. 2A/B/C, or the design of FIG. 2A in a bottle 1 as shown in FIG. 3A/B/C.

Figure 4B:
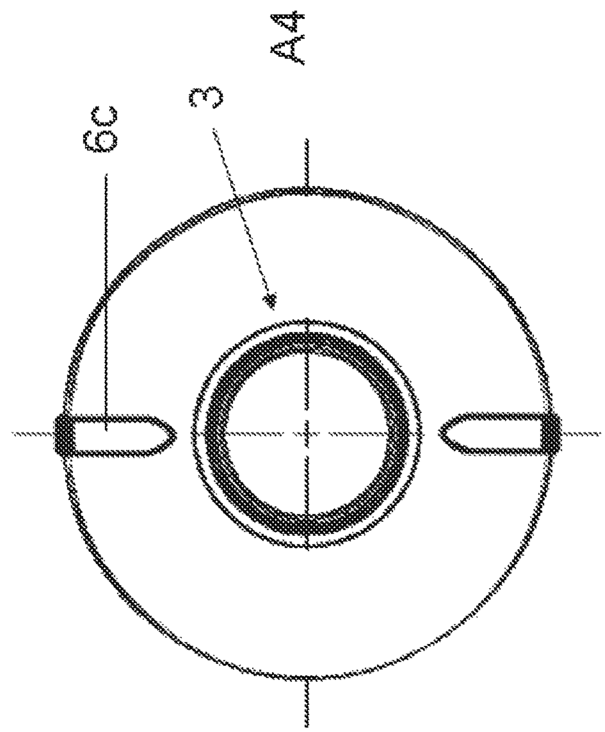
FIG. 4B shows a plan view of an alternative embodiment of the container according to the invention.
Figure 4A:
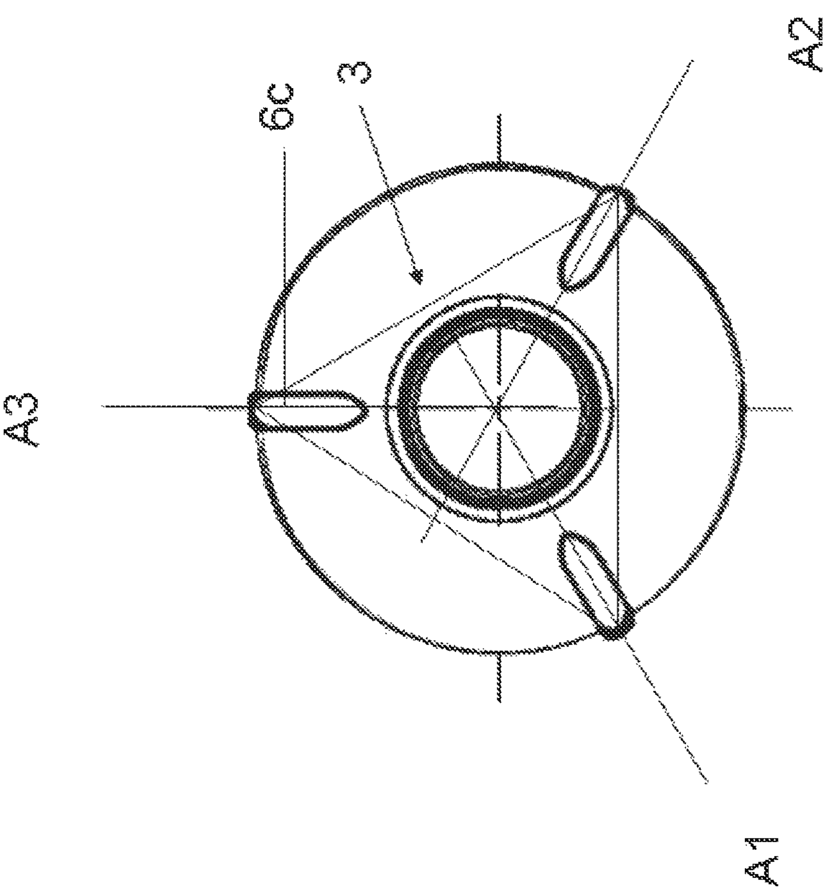
FIG. 4A shows a plan view of the container according to the invention.

FIG. 4A and FIG. 4B each also show a plan view of the container 1 according to the invention.

FIG. 4A shows a plan view of a container 1 with three tie members 6. The tie members are here each arranged at the same distance to each other distributed around the circumference. By mentally connecting one tie member 6 with the other two, an isosceles triangle results having symmetrical angles. The angular symmetry is represented by the axes A1, A2 and A3, each extending from a tie member 6 through the center axis of the container 1.

Such a polygon is geometrically defined and particularly well adapted to receive pressure without deforming.

FIG. 4B shows a plan view of a container 1 with two tie members 6. The two tie members are here arranged symmetrically with respect to the symmetry line A4.

It is evident in both FIG. 4A and FIG. 4B that the tie members 6*c* were extended up into the shoulder section 5.

How the tie members 6*b* are designed in the body section 4 cannot be seen using this representation. But all possible embodiments shown in FIGS. 2A, 2B, 2C, 3A, 3B, 3C are conceivable.

Figure 5:
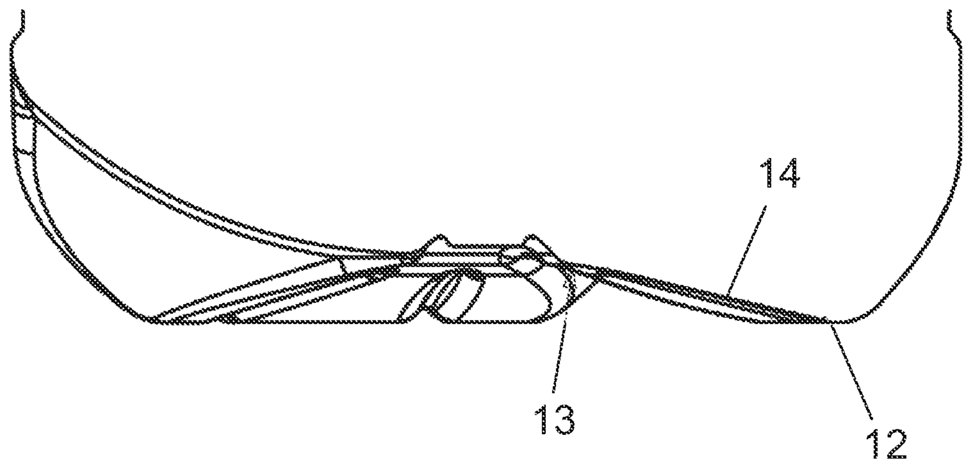
FIG. 5 shows a longitudinal section through a base section of a container according to the invention.

FIG. 5 shows a longitudinal section through a container according to the invention, in particular its base section. Here, the wall in the region 13 has an inwardly directed curvature. The region 13 can in particular be rotationally symmetrical to the longitudinal axis and be adjacent to the injection point or a central dome. The region 13 is connected to the foot rim 12 of the container across a planar surface 14. In the longitudinal section of FIG. 5, this planar surface 14 forms a straight line.

Figure 6:
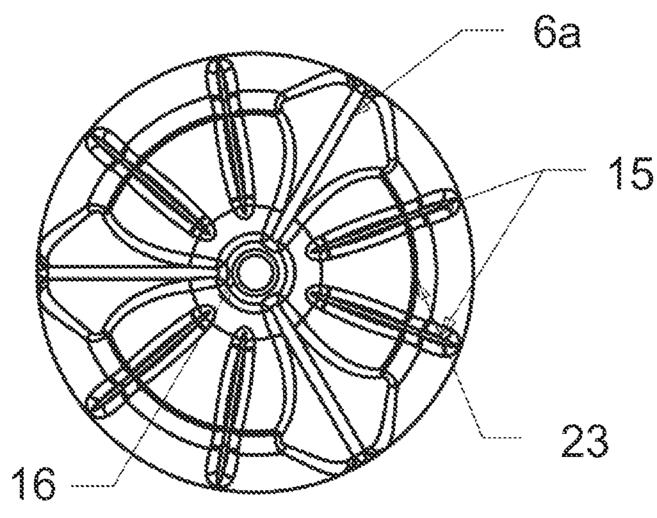
FIG. 6 shows a plan view of the base of a container according to the invention.

FIG. 6 shows a plan view of the base of a container according to the invention. It shows in particular an annular rest 23 and a central dome 16. Three tie members 6*a* originate from the base center and extend continuously upwardly to the side wall of the base. Reinforcement grooves 15 are shown between the tie members 6*a*. The annular rest 23 is interrupted by the tie members 6*a* and the reinforcement grooves 15.

Figure 7:
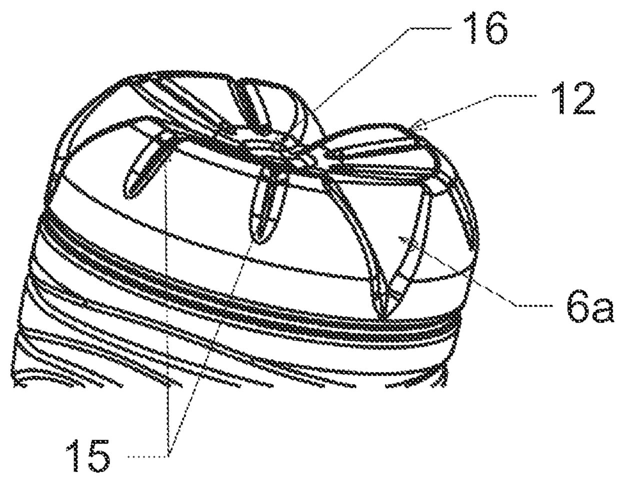
FIG. 7 shows a perspective view of the base of a container according to the invention.
Figure 11:
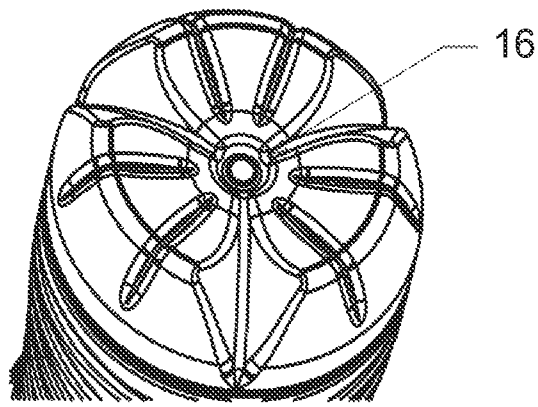
FIG. 11 shows a perspective view of the base of a container according to the invention.

FIG. 7 shows a respective perspective view of the container of FIG. 6 according to the invention. FIG. 11 as well shows a respective perspective view, but at a slightly different perspective angle.

As can be gathered in particular from FIG. 11, the tie members in this example run into the central dome 16. In principle, the tie members 6*a* could also not run into the central dome 16, but tangentially peter out before, meaning outside of the central dome 16, to 0 mm depth.

Embodiments in which no central dome is formed are also possible.

The reinforcement grooves 15 can in the area of the foot rim 12 be deepest.

Figure 9:
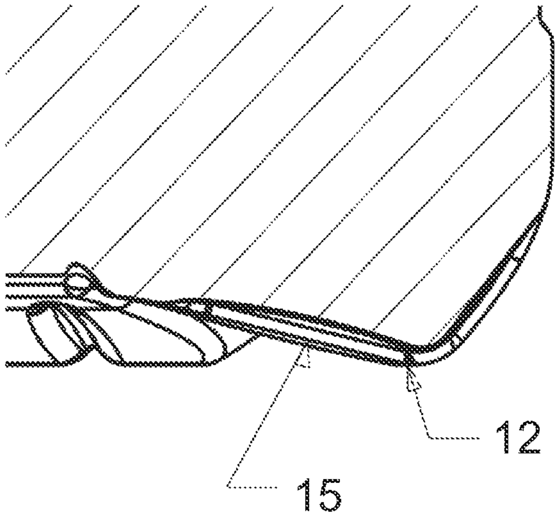
FIG. 9 shows a longitudinal section through a part of the base section of a container according to the invention.

According to one embodiment, the reinforcement grooves 15 can have a radially varying depth, therefore do not run parallel to the outer contour of the base. The depth of the reinforcement grooves 15 can therefore vary depending on the distance from the central axis of the container. This embodiment is illustrated in FIG. 9.

The reinforcement grooves 15 can likewise extend into the central dome, and in particular into the end of the tie members in the injection point. FIGS. 6 and 11, however, illustrate the alternative, according to which the reinforcement grooves 15 end outside the central dome 16, i.e. do not reach into the central dome 16.

Figure 8:
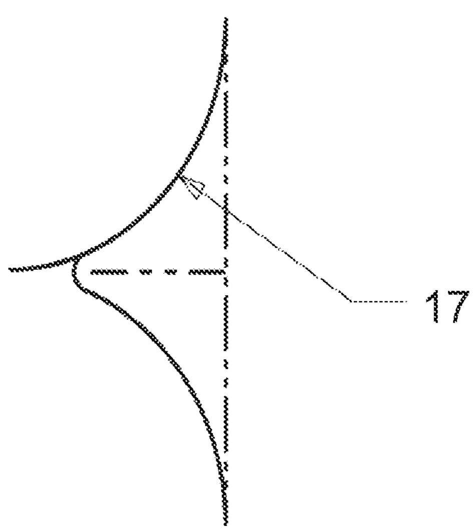
FIG. 8 shows a section profile of a tie member of a container according to the invention.

The section profile 17 of the tie member regions can have a constant radius (radius of curvature). This is illustrated in FIG. 8. This can in particular be the case in the area of the side wall of the base.

Figure 10:
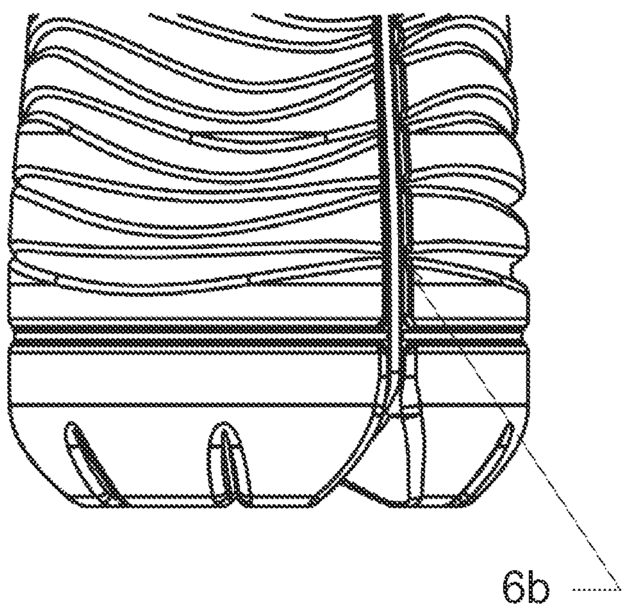
FIG. 10 shows a side view of a part of a container according to the invention.

As shown in FIG. 10, the tie members 6*b* run on the outer side of the body section through a plurality of circumferential grooves. This has already been explained in connection with FIG. 2A.

The tie member bottom and the bottom of the circumferential grooves can in particular be located in one plane.

Figure 14:
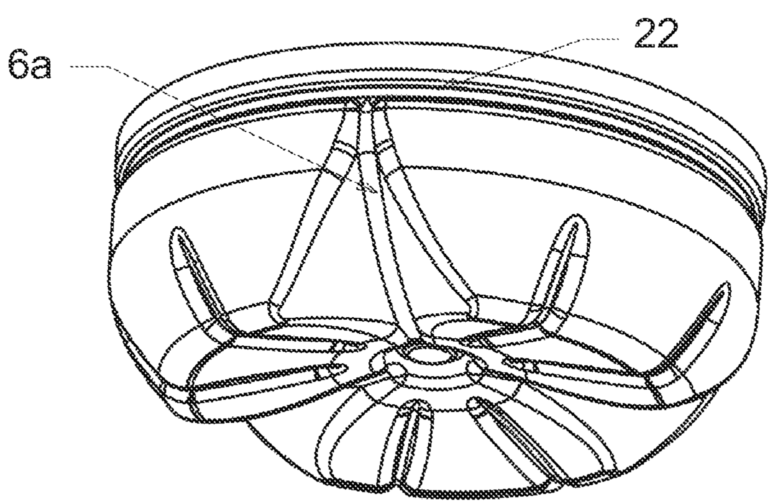
FIG. 14 shows a perspective view of the base of a container according to the invention.

According to an alternative shown in FIG. 14, the tie members 6*a* can also tangentially run into or end in the lowermost circumferential groove 22 on the outer side of the body section.

Figure 15:
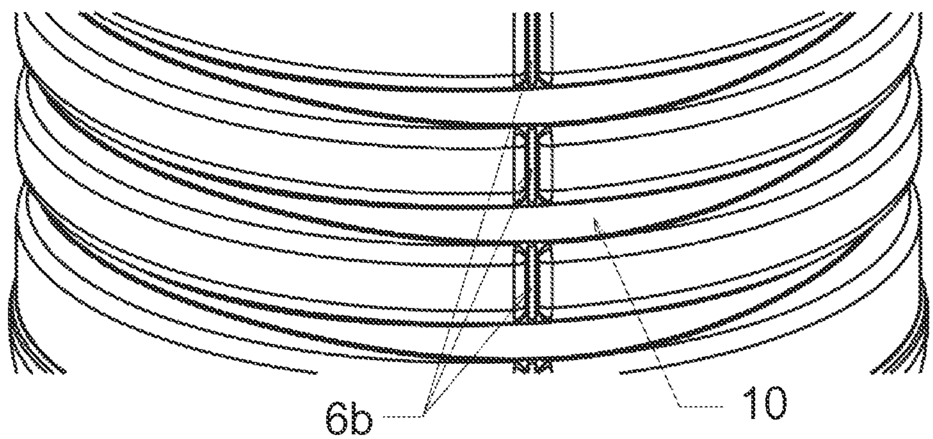
FIG. 15 shows a perspective view of a part of the body of a container according to the invention.

As shown in FIG. 15, it is also possible that the tie members 6*b* on the outer side of the body section run through a plurality of circumferential grooves such, that the groove geometry of the intersected grooves remains. The tie member 6*b* and the circumferential groove 10 are in this area therefore arranged at the same depth (in the groove bottom). The groove 10 can be in this area therefore experience flattening between 0.1 mm and 0.3 mm. The variability of the groove 10 is here given in the upper lateral region. The geometry of the bottom of the groove is not interrupted.

Figure 12:
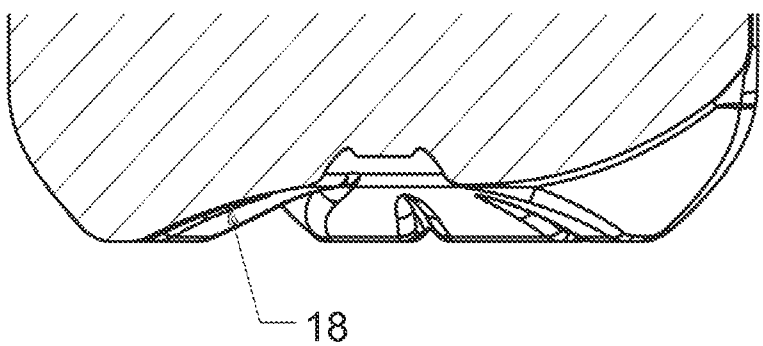
FIG. 12 shows a longitudinal section through a base section of a container according to the invention.

FIG. 12 shows a longitudinal section through a base section of a further container according to the invention. It is shown therein, how a central dome is adjacent to a partial region 18 of the base section which has a constant radius of curvature and connects the central dome with the foot rim.

Figure 13:
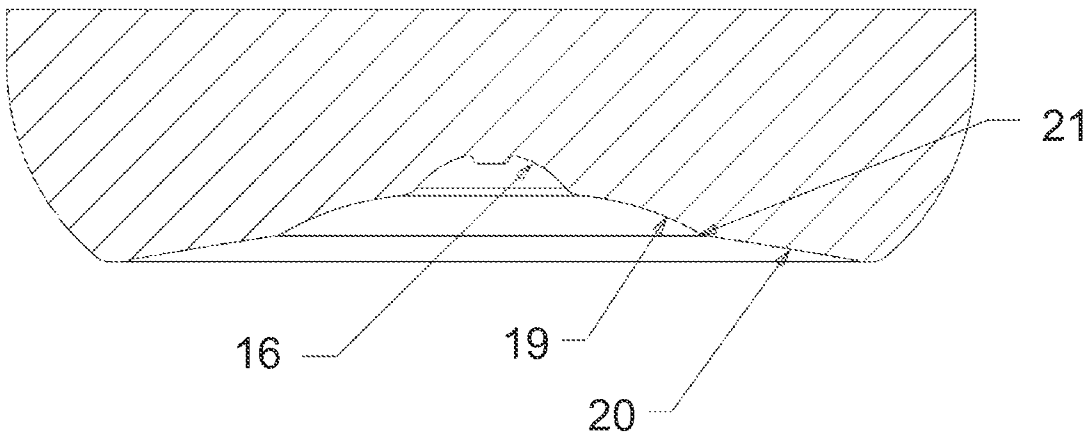
FIG. 13 shows a longitudinal section through a base section of a container according to the invention.

FIG. 13 shows a longitudinal section through a base section of a further container according to the invention. This shows adjacent to the central dome 16, a first region 19 having a radius of curvature which is greater than that of the central dome 16. A first region 19 is followed by a second region 20, which can be either planar or has a radius of curvature which is greater than that of the first region 19. In this manner, a step 21 is formed between the first region 19 and the second region 20. Such a step is also formed between the central dome 16 and the first region 19. The second region 20 then merges into the foot rim of the container.

The dome 16 can in particular have a constant radius of curvature.

Figure 16:
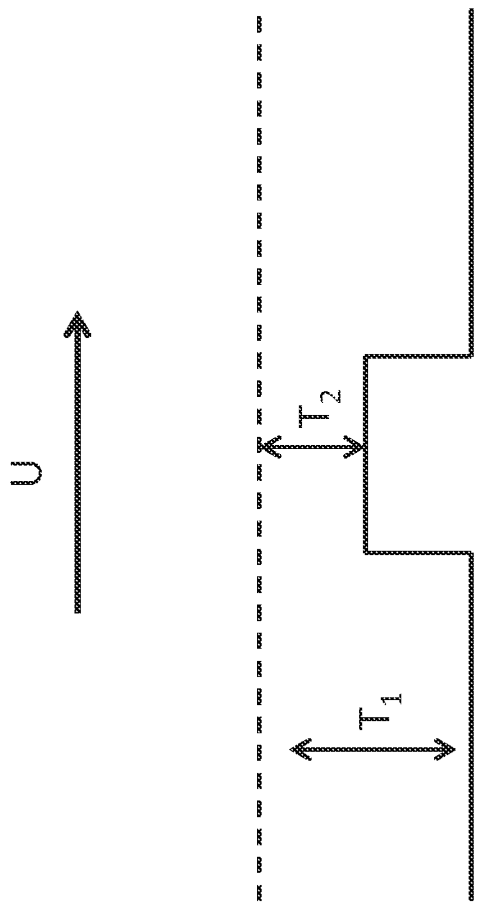
FIG. 16 shows a cross section of a container.

FIG. 16 shows a cross section of a container in the area of a tie member. The level of the bottle surface outside of the grooves is illustrated by the dashed line. The depth of the grooves is indicated with $T_1$ and the depth of the grooves in the area of a tie member is indicated as $T_2$. The arrow U refers to the peripheral direction. In the illustrated embodiment, the grooves have varying depths $T_1$, $T_2$ in the peripheral direction.

A container described above can be used in particular for an intended internal pressure of 0.1 bar to 1.5 bar.

All the features disclosed in the application documents are claimed as features being essential to the invention, to the extent that they are individually or in combination novel over prior art.

LIST OF REFERENCE NUMERALS

- 1 container
- 2 base
- 3 neck
- 4 body
- 5 shoulder
- 6 tie member
  - a. tie member in the base section
  - b. tie member in the body section
  - c. tie member in the shoulder section
- 7 foot
- 8 injection point
- 9 groove
- 10 groove with varying depth
- 11 labeling area
- 12 foot rim
- 13 curved area
- 14 planar area
- 15 reinforcement groove
- 16 central dome
- 17 section profile tie member
- 18 partial region of the base section
- 19 first region
- 20 second region
- 21 step
- 22 lowermost circumferential groove
- A1 axis
- A2 axis
- A3 axis
- A4 axis
- U peripheral direction
- L longitudinal direction

What is claimed is:

1. A plastic container comprising:

a neck section, a shoulder section, a body section and a base section, wherein said base section comprises at least two tie members extending from a central area to a side wall of said base section, the tie members formed as partial grooves that extend in a longitudinal direction, such that the tie members are arranged between feet of the base section;

wherein at least one reinforcement groove is provided between the two tie members, the reinforcement grooves comprising a varying depth in a radial direction;

wherein there are at least in certain areas circumferential grooves provided in a peripheral direction comprising a varying depth, between said tie members;

the tie members extend into the body section and the shoulder section of the plastic container; and wherein the tie members end immediately before or after a labeling area of the body region intended for receiving a label.

2. The plastic container of claim 1, wherein the circumferential grooves are provided above said tie members, or below said tie members in said body section or said shoulder section.

3. The plastic container of claim 1, wherein said tie members or said tie member function are designed extending substantially in a longitudinal direction on a periphery of said container from said base section towards said neck section of said container.

4. The plastic container of claim 1, wherein said base section comprises at least two feet and an amount of said feet is a multiple of the number of said tie members.

5. The plastic container of claim 4, wherein for two tie members, there are two, four, six, eight, ten, or twelve feet and for three tie members, there are three, six, nine, or twelve feet.

6. The plastic container of claim 1, wherein said tie members extend across certain regions of said bottle, in particular across said body region or across said body region and said shoulder region.

7. The plastic container of claim 2, wherein said tie members extend radially inwardly transversely, in particular perpendicularly, to said circumferential grooves.

8. The plastic container of claim 1, wherein said circumferential grooves at locations, at which they have a function of a tie member, have a distinctly shallower depth than in intermediate areas.

9. The plastic container of claim 1, wherein said tie members are formed in a labeling area such as to enable application of a label.

10. A plastic container comprising:

a neck section, a shoulder section, a body section and a base section, wherein the base section includes at least two tie members extending from a central area to a side wall of the base section;

wherein at least one reinforcement groove is provided between the two tie members, the reinforcement grooves comprising a varying depth in a radial direction;

wherein there are at least in certain areas circumferential grooves provided in a peripheral direction comprising a varying depth, between the tie members;

wherein the tie members configured in the shape of a radially outwardly projecting bar; and the base section further comprising a central dome, a first region, and a second region, the first region adjacent the central dome, the first region having a first radius of curvature greater than the central dome, the second region adjacent the first region, the second region having a second radius of curvature greater than the first radius of curvature.

11. A plastic container comprising:

a neck section, a shoulder section, a body section and a base section, wherein said base section comprises at least three tie members extending from a central area to a side wall of said base section, wherein one of the tie members extends intermittently from an injection point in the base section into the body section and the shoulder section of said plastic container;

wherein at least one reinforcement groove is provided between the two tie members, the reinforcement grooves comprising a varying depth in a radial direction;

the plastic container further comprising circumferential grooves provided in a peripheral direction above the tie members in the body section or said shoulder section; and the circumferential grooves having varying depths in said peripheral direction, the circumferential grooves further having a first depth at a first location where the circumferential grooves function as a tie member, the circumferential grooves further having a second depth at an intermediate area, the first depth being shallower than the second depth.

* * * * *